(12) United States Patent
Qi et al.

(10) Patent No.: US 11,336,880 B2
(45) Date of Patent: May 17, 2022

(54) EYEWEAR AND CONTROL METHOD THEREOF

(71) Applicant: BOE TECHNOLOGY GROUP CO., LTD., Beijing (CN)

(72) Inventors: Aixiang Qi, Beijing (CN); Kening Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/254,947

(22) PCT Filed: Jun. 24, 2020

(86) PCT No.: PCT/CN2020/097880
§ 371 (c)(1),
(2) Date: Dec. 22, 2020

(87) PCT Pub. No.: WO2020/259527
PCT Pub. Date: Dec. 30, 2020

(65) Prior Publication Data
US 2021/0297648 A1    Sep. 23, 2021

(30) Foreign Application Priority Data
Jun. 24, 2019 (CN) .......................... 201910547458.1

(51) Int. Cl.
*H04N 13/133* (2018.01)
*H04N 13/207* (2018.01)
(Continued)

(52) U.S. Cl.
CPC ............ *H04N 13/133* (2018.05); *G02C 9/00* (2013.01); *H04N 13/207* (2018.05); *H04N 13/344* (2018.05); *H04N 2213/008* (2013.01)

(58) Field of Classification Search
USPC .......................................................... 348/46
See application file for complete search history.

(56) References Cited

U.S. PATENT DOCUMENTS

2008/0062297 A1    3/2008 Sako et al.
2016/0033770 A1*   2/2016 Fujimaki .............. H04N 13/344
                                                          345/8
(Continued)

FOREIGN PATENT DOCUMENTS

CN    101141567 A    3/2008
CN    104267501 A    1/2015
(Continued)

OTHER PUBLICATIONS

China Patent Office, First Office Action dated Feb. 5, 2021, for corresponding Chinese application 201910547458.1.

*Primary Examiner* — Behrooz M Senfi
(74) *Attorney, Agent, or Firm* — Houtteman Law LLC

(57) ABSTRACT

The present disclosure relates to an eyewear and a control method thereof. The eyewear includes an optic, a camera device and a frame; wherein the optic and the camera device are respectively located on the frame; and the optic is a transparent display screen. The control method of the eyewear includes: detecting a light intensity of ambient light; obtaining a current light intensity of transmitted light generated after the ambient light passes through the optic, based on the light intensity of the ambient light and current light transmittance of the eyewear; adjusting the light transmittance of the optic; starting the camera device to acquire an environment image; performing enhancement processing on the environment image to obtain an enhanced environment image; and controlling the optic to display according to the enhanced environment image.

9 Claims, 4 Drawing Sheets

(51) Int. Cl.
*H04N 13/344* (2018.01)
*G02C 9/00* (2006.01)

(56) References Cited

U.S. PATENT DOCUMENTS

| | | | | |
|---|---|---|---|---|
| 2016/0050345 | A1* | 2/2016 | Longbotham | G02B 27/0172 |
| | | | | 348/47 |
| 2017/0176751 | A1 | 6/2017 | Ouderkirk et al. | |
| 2018/0267601 | A1* | 9/2018 | Yoon | G06F 3/011 |
| 2020/0073531 | A1* | 3/2020 | Romano | G06F 3/04815 |
| 2020/0089025 | A1* | 3/2020 | Li | G02F 1/137 |
| 2020/0341558 | A1* | 10/2020 | Fukushima | G06K 9/00201 |

FOREIGN PATENT DOCUMENTS

| | | |
|---|---|---|
| CN | 106164746 A | 11/2016 |
| CN | 106249431 A | 12/2016 |
| CN | 107065183 A | 8/2017 |
| CN | 109674579 A | 4/2019 |
| CN | 208780929 U | 4/2019 |
| CN | 110109256 A | 8/2019 |
| EP | 1990674 A | 11/2018 |
| WO | WO20180229688 A | 12/2018 |

\* cited by examiner

EYEWEAR AND CONTROL METHOD THEREOF

CROSS-REFERENCE TO RELATED APPLICATION

The present application claims priority to Chinese Patent Application 201910547458.1 filed with the China National Intellectual Property Administration on Jun. 24, 2019, the disclosure of which is incorporated herein by reference in its entirety.

TECHNICAL FIELD

The present disclosure relates to the field of information processing technologies, and particularly relates to an eyewear and a control method thereof.

BACKGROUND

Human eyes usually adjust luminous flux by adjusting a pupil size under strong light. However, when the light is too strong to be adjusted by human eyes, the human eyes will be injured, and have uncomfortable feelings such as eye fatigue. Therefore, people usually choose to wear a polarized eyewear under strong light, so as to change the light intensity felt by the eyes, and reduce fatigue caused by the eye adjustment or damage caused by the strong light. However, when the ambient light becomes weak, such as people going from outdoor to indoor, the human eyes wearing the polarized eyewear will feel too dark and obscure. Therefore, how to make a user clearly see the surrounding environment in both a strong light environment and a dark light environment is a technical problem to be solved.

SUMMARY

The present disclosure provides an eyewear and a control method thereof that can solve defects in the related art.

According to a first aspect of the embodiments of the present disclosure, there is provided a control method of an eyewear including an optic, a camera device and a frame; wherein the optic and the camera device are respectively located on the frame; and the optic is a transparent display screen; the control method of the eyewear including: detecting a light intensity of ambient light; obtaining a current light intensity of transmitted light generated after the ambient light passes through the optic, based on the light intensity of the ambient light and current light transmittance of the eyewear; adjusting the light transmittance of the optic when the current light intensity is greater than a first light intensity so that the light intensity of the transmitted light is the first light intensity; starting the camera device to acquire an environment image when the current light intensity is smaller than the first light intensity; and performing enhancement processing on the environment image to obtain an enhanced environment image; and controlling the optic to display according to the enhanced environment image.

In an embodiment, the eyewear further includes a lens located on and movably connected to the frame; when the current light intensity is smaller than the first light intensity, the lens is positioned opposite to the optic, and a positional relation between the lens and the optic meets a selected condition so that the environment image displayed by the optic is imaged clearly on a fundus of a human eye; and when the current light intensity is equal to or greater than the first light intensity, the lens is not positioned opposite to the optic.

In an embodiment, the frame includes a guide rail on which the lens is located; and the control method further includes: controlling the lens to move to a position opposite to the optic along the guide rail in a first direction when the current light intensity is smaller than the first light intensity; and controlling the lens to move to a designated position along the guide rail in a second direction when the current light intensity is equal to or greater than the first light intensity; wherein the second direction and the first direction are opposite to each other, and the lens is not located opposite to the optic at the designated position.

In an embodiment, the eyewear further includes a receiving device located on the frame; a first end of the guide rail is located in the receiving device; when the lens is located at the first end of the guide rail, the lens is located in an accommodation space of the receiving device; and when the current light intensity is smaller than the first light intensity, the lens is located at a second end of the guide rail, and positioned opposite to the optic.

In an embodiment, the guide rail is movably connected to the frame; and when the current light intensity is equal to or greater than the first light intensity, the second end of the guide rail is not positioned opposite to the optic.

In an embodiment, two optics are provided; the eyewear includes a first optic and a second optic; the camera device includes one camera; starting the camera device to acquire the environment image includes: starting the camera to acquire a 3D environment image; performing enhancement processing on the environment image to obtain the enhanced environment image includes: performing enhancement processing on the 3D environment image to obtain an enhanced 3D environment image; and controlling the optic to display according to the enhanced environment image includes: converting the enhanced 3D environment image into a 2D environment image; splitting the 2D environment image to obtain a left-eye image and a right-eye image; and controlling the first optic to display the left-eye image and controlling the second optic to display the right-eye image.

In an embodiment, two optics are provided; the eyewear includes a first optic and a second optic; the camera device includes a first camera and a second camera; the first camera is located on a side of the first optic on the frame, and the second camera is located on a side of the second optic on the frame; the environment image includes a first environment image and a second environment image; starting the camera device to acquire the environment image includes: starting the first camera to acquire the first environment image, and starting the second camera to acquire the second environment image; performing enhancement processing on the environment image to obtain the enhanced environment image includes: performing enhancement processing on the first environment image to obtain an enhanced first environment image; and performing enhancement processing on the second environment image to obtain an enhanced second environment image; and controlling the optic to display according to the enhanced environment image includes: controlling the first optic to display according to the enhanced first environment image, and controlling the second optic to display according to the enhanced second environment image.

In an embodiment, two optics are provided; the eyewear includes a first optic and a second optic; the camera device includes one camera; the camera is located on a side of the first optic on the frame, or the camera is located on a side of the second optic on the frame; starting the camera device to acquire the environment image includes: starting the camera to acquire a 3D environment image; performing enhancement processing on the environment image to obtain the enhanced environment image includes: performing enhancement processing on the 3D environment image to obtain an enhanced 3D environment image; and controlling the optic to display according to the enhanced environment image includes: controlling the first optic to display according to the enhanced 3D environment image when the camera is located on the side of the first optic on the frame, and controlling the second optic to display according to the enhanced 3D environment image when the camera is located on the side of the second optic on the frame.

According to a second aspect of the embodiments of the present disclosure, there is provided an eyewear, including: an optic, an optical sensor, a camera device, a frame, a processor and a memory; wherein the optic, the optical sensor, the camera device, the processor and the memory are respectively located on the frame; the optic is a transparent display screen; the memory is configured to store a computer program; and the processor is configured to execute the computer program stored on the memory to implement steps of the above method.

According to a third aspect of the embodiments of the present disclosure, there is provided a computer readable storage medium having a computer program stored thereon which, when executed by a processor, causes steps of the above method to be implemented.

According to the above embodiments, by detecting the light intensity of the ambient light, obtaining the current light intensity of transmitted light generated after the ambient light passes through the optic, based on the light intensity of the ambient light and current light transmittance of the eyewear, and adjusting, when the current light intensity is equal to or greater than the selected light intensity, the light transmittance of the optic so that the light intensity of the transmitted light is the selected light intensity, a user can clearly see the surrounding environment information in a strong light environment, while fatigue caused by eye adjustment in the strong light environment or damage caused by the strong light is relieved. By starting the camera device to acquire the environment image when the current light intensity is smaller than the selected light intensity, performing enhancement processing on the environment image to obtain the enhanced environment image, and then controlling the optic to display according to the enhanced environment image, a user can also clearly see the surrounding environment information in a dark light environment. In summary, the technical solution provided by the embodiments of the disclosure can enable a user to clearly see the surrounding environment information in both a strong light environment and a dark light environment.

It will be appreciated that the foregoing general description and the following detailed description are exemplary and explanatory only and are not restrictive of the disclosure.

BRIEF DESCRIPTION OF THE DRAWINGS

The accompanying drawings here, which are incorporated in and constitute a part of the description, illustrate embodiments consistent with the present disclosure and, together with the description, serve to explain principles of the present disclosure.

DETAILED DESCRIPTION OF THE EMBODIMENTS

The exemplary embodiments will be explained in detail here, examples of which are illustrated in the accompanying drawings. The following description refers to the accompanying drawings in which the same numbers in different figures represent the same or similar elements unless otherwise indicated. The implementations described in the exemplary embodiments below do not represent all implementations consistent with the present disclosure. Rather, they are merely examples of devices and methods consistent with certain aspects of the disclosure, as detailed in the appended claims.

Figure 1:
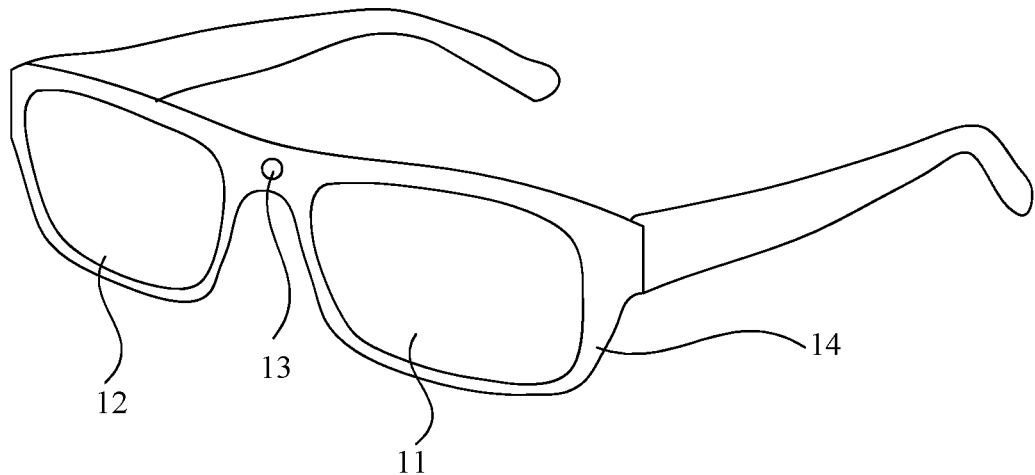
FIG. 1 is a schematic structural diagram of an eyewear according to an embodiment of the present disclosure.
Figure 2:
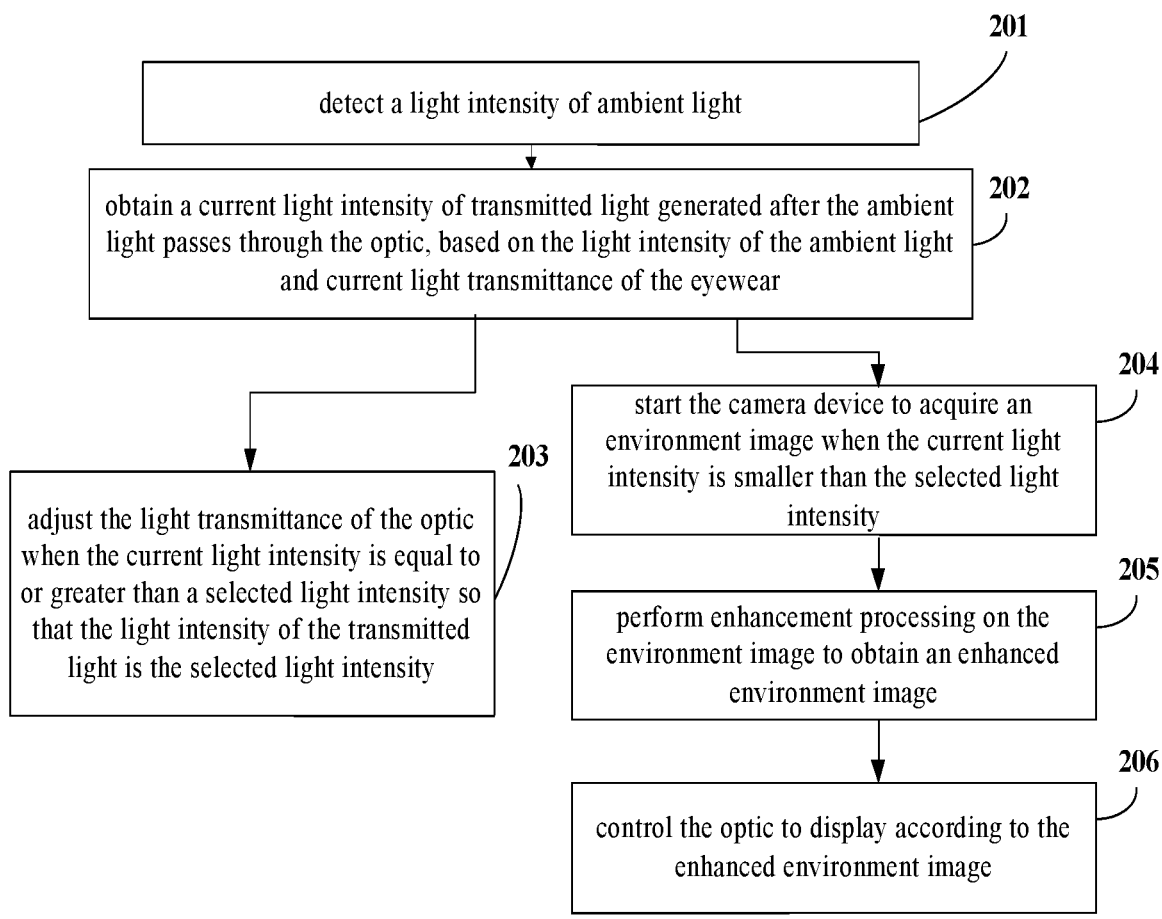
FIG. 2 is a flowchart of a control method of an eyewear according to an embodiment of the present disclosure.

In an embodiment of the present disclosure, there is provided a control method of an eyewear. In this embodiment, as shown in FIG. 1, the eyewear may include optics 11, 12, a camera device 13 and a frame 14. The optics 11, 12 and the camera device 13 are respectively located on the frame 14, and each of the optics 11, 12 is a transparent display screen. As shown in FIG. 2, the control method of an eyewear may include the following steps 201 to 206.

In step 201, a light intensity of ambient light is detected.

In this embodiment, the eyewear may be further provided with an optical sensor and a processor electrically connected to the optical sensor. The optical sensor is configured to detect a light intensity L of ambient light. Specifically, the optical sensor converts an optical signal of the detected ambient light into an electrical signal and sends the same to the processor. The electrical signal carries information about the light intensity L of the ambient light.

In step 202, a current light intensity of transmitted light generated after the ambient light passes through the optic is obtained based on the light intensity of the ambient light and current light transmittance of the eyewear.

In this embodiment, the processor may calculate the current light intensity L' of transmitted light generated after the ambient light passes through the optics 11, 12 based on the light intensity L of the ambient light and a current light transmittance $T_0$ of the eyewear, where $L'=L*T_0$. The transmitted light may enter a human eye.

In step 203, when the current light intensity is greater than the selected (first) light intensity, the light transmittance of each of the optics is adjusted so that the light intensity of the transmitted light is the selected light intensity. When the current light intensity is equal to the selected light intensity, no adjustment of the light transmittance of the optic is required.

In this embodiment, when the current light intensity L' is greater than the selected light intensity $L_{selected}$, the processor may adjust the light transmittance of each of the optics 11, 12 so that the light intensity of the transmitted light is the selected light intensity $L_{selected}$. The selected light intensity, $L_{selected}$, may be a comfortable light intensity incident into a human eye. The selected light intensity may be preset in the eyewear, or may be set by a user according to actual conditions. In this manner, a user can clearly see the surrounding environment information in a strong light environment, while fatigue caused by eye adjustment in the strong light environment or damage caused by the strong light is relieved.

In this embodiment, the optics 11, 12 may be glass sheets with adjustable light transmittance or a composite structure with adjustable light transmittance, which is not limited in the embodiments of the disclosure.

In step 204, the camera device is started to acquire an environment image when the current light intensity is smaller than the selected light intensity.

In this embodiment, when the current light intensity L' is smaller than the selected light intensity $L_{selected}$, the processor may start the camera device 13 to acquire an environment image. The environment image is an image captured by the camera device 13, and carries surrounding environment information of the eyewear. In this embodiment, the camera device 13 may include one camera which may be located in the middle of the eyewear. The processor may start the camera to acquire a 3D environment image. The 3D environment image carries 3D environment information.

In step 205, enhancement processing is performed on the environment image to obtain an enhanced environment image.

In this embodiment, the processor may perform enhancement processing on the 3D environment image to obtain an enhanced 3D environment image. Specifically, the processor may perform enhancement processing on the 3D environment image using an image enhancement algorithm, so as to adjust any one or any combination of brightness, contrast, saturation, and hue of the image, thereby increasing definition of the image and reduce noises. For example, the processor may perform enhancement processing on the 3D environment image using one or at least two of histogram equalization, laplacian, Log (logarithmic) transform, gamma transform algorithms and the like, to obtain an enhanced 3D environment image. When using the histogram equalization and laplacian algorithms to perform enhancement processing on the 3D environment image, the image contrast may be enhanced. When using the Log transform algorithm to perform enhancement processing on the 3D environment image, a low grayscale value part of the image may be expanded to display more details of the low grayscale part, while a high grayscale value part of the image may be compressed to reduce details of the high grayscale value part, thereby achieving the purpose of emphasizing the low grayscale part of the image. When using algorithms such as gamma transform to perform enhancement processing on the 3D environment image, an image with too high grayscale or too low grayscale may be corrected to enhance the contrast.

In step 206, the optic is controlled to display according to the enhanced environment image.

In this embodiment, the eyewear may include a first optic 11 and a second optic 12. When a user wears the eyewear, the first optic 11 is positioned opposite to a left eye of the user, and the second optic 12 is positioned opposite to a right eye of the user.

In this embodiment, the processor may convert the enhanced 3D environment image into a 2D environment image, split the 2D environment image to obtain a left-eye image and a right-eye image, and then control the first optic 11 to display the left-eye image and control the second optic to 12 to display the right-eye image. For example, the processor may split the 2D environment image using a method of splitting a parity map. Specifically, pixels of odd lines in the 2D environment image may be extracted to obtain the left-eye image, and pixels of even lines in the 2D environment image may be extracted to obtain the right-eye image. Obviously, the method of splitting the 2D environment image is not limited to the above. In this manner, a user can see a 3D environment image through the eyewear. With the eyewear in this embodiment, a user can also clearly see the surrounding environment information in a dark light environment.

In the embodiments of the present disclosure, by detecting the light intensity of the ambient light, obtaining the current light intensity of transmitted light generated after the ambient light passes through the optic, based on the light intensity of the ambient light and current light transmittance of the eyewear, and adjusting, when the current light intensity is greater than the selected light intensity, the light transmittance of the optic so that the light intensity of the transmitted light is the selected light intensity, a user can clearly see the surrounding environment information in a strong light environment, while fatigue caused by eye adjustment in the strong light environment or damage caused by the strong light is relieved. By starting the camera device to acquire the environment image when the current light intensity is smaller than the selected light intensity, performing enhancement processing on the environment image to obtain the enhanced environment image, and then controlling the optic to display according to the enhanced environment image, a user can also clearly see the surrounding environment information in a dark light environment. In summary, the technical solution provided by the embodiments of the disclosure can enable a user to clearly see the surrounding environment information in both a strong light environment and a dark light environment.

In an embodiment of the present disclosure, there is further provided a control method of an eyewear. In this embodiment, on the basis of the embodiment shown in FIG. 2, the eyewear further includes a lens located on and movably connected to the frame 14.

Figure 3:
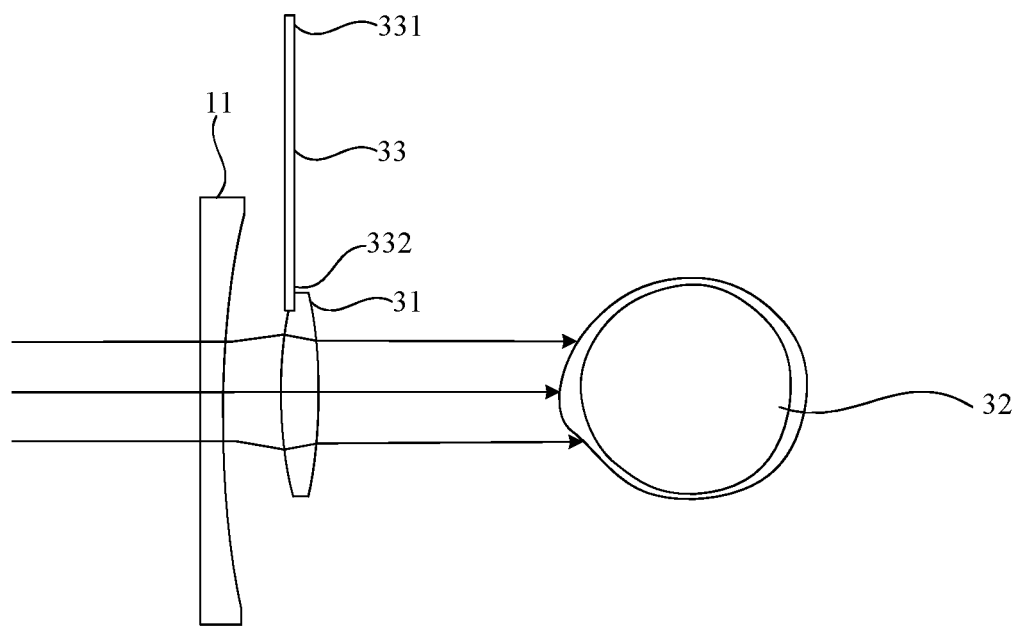
FIG. 3 is a schematic diagram illustrating a positional relation between an optic and a lens according to an embodiment of the present disclosure.

As shown in FIG. 3, when the current light intensity is smaller than the selected light intensity, the lens 31 is positioned opposite to the optic 11 (or the optic 12). Light 34 enters a human eye 32 after passing through the optic 11 and the lens 31 in sequence, and the positional relation between the lens 31 and the optic 11 meets a selected condition so that the environment image displayed by the optic 11 is imaged clearly on a fundus of the human eye 32. The selected condition may be preset in the eyewear, or may be set by a user according to actual conditions. Here, the opposite position means locating at counter positions in an optical path direction, that is, the lens 31 and the optic 11 (or the optic 12) are at counter positions in the optical path direction of the light 34.

Figure 4:
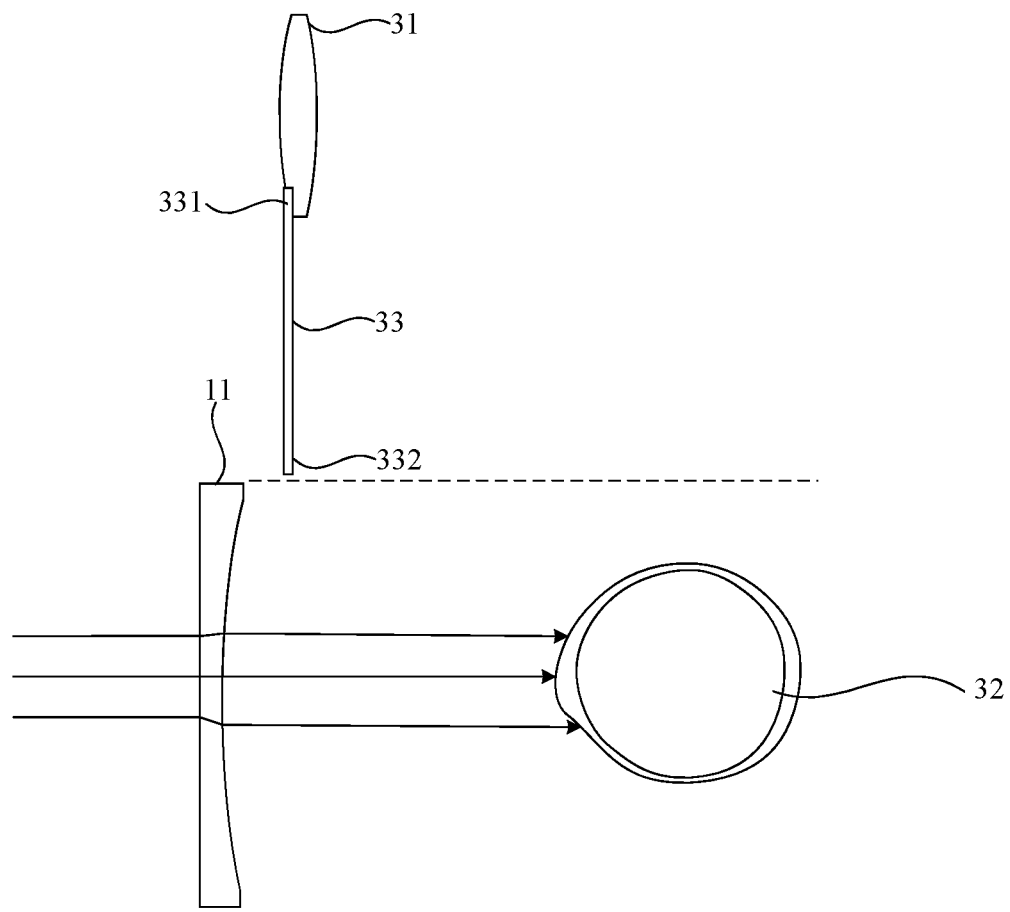
FIG. 4 is a schematic diagram illustrating another positional relation between an optic and a lens according to an embodiment of the present disclosure.

As shown in FIG. 4, when the current light intensity is equal to or greater than the selected light intensity, the lens 31 is not positioned opposite to the optic 11.

In this embodiment, as shown in FIG. 3, the frame 14 may be provided with a guide rail 33 on which the lens 31 may be located.

Optionally, the guide rail 33 may be movably connected to the frame 14, and the lens 31 may be movable on the guide rail 33. In this case, when the current light intensity is smaller than the selected light intensity, the processor may control the guide rail 33 to move in a first direction until a second end 332 of the guide rail 33 is opposite to the optic 11, and the processor may control the lens 31 to move along the guide rail 33 in the first direction to the second end 332 of the guide rail 33, i.e., the processor may control the lens 31 to move along the guide rail 33 in the first direction to a position opposite to the optic 11.

When the current light intensity is equal to or greater than the selected light intensity, the processor may control the guide rail 33 to move in a second direction until the second end 332 of the guide rail 33 is not opposite to the optic 11, and the processor may control the lens 31 to move along the guide rail 33 in the second direction to a first end 331 of the guide rail 33, i.e., the processor may control the lens 31 to move along the guide rail 22 in the second direction to a designated position where the lens 31 is not located opposite to the optic 11. The second direction and the first direction are opposite to each other. In this embodiment, the first direction may be a direction toward the optic 11.

It will be appreciated that the guide rail 33 may be further fixedly connected to the frame 14, while the lens 31 may be movable on the guide rail 33. When the current light intensity is smaller than the selected light intensity, the processor may control the lens 31 to move along the guide rail 33 in the first direction to the second end 332 of the guide rail 33, i.e., the processor may control the lens 31 to move along the guide rail 33 in the first direction to a position opposite to the optic 11. When the current light intensity is equal to or greater than the selected light intensity, the processor may control the lens 31 to move along the guide rail 33 in the second direction to a first end 331 of the guide rail 33, i.e., the processor may control the lens 31 to move along the guide rail 22 in the second direction to a designated position where the lens 31 is not located opposite to the optic 11.

In this embodiment, when the current light intensity is equal to or greater than the selected light intensity, the lens 31 may be located above the frame 14.

In this embodiment, the eyewear may further include a receiving device. The receiving device may be located on the frame 14. The first end 331 of the guide rail 33 may be located in the receiving device. When the lens 31 is located at the first end 331 of the guide rail 33, the lens 31 may be located in an accommodation space of the receiving device. In this manner, the lens can be protected and dust prevention is achieved. When the current light intensity is smaller than the selected (first) light intensity, the lens is located at the second end of the guide rail and positioned opposite to the optic.

Figure 5:
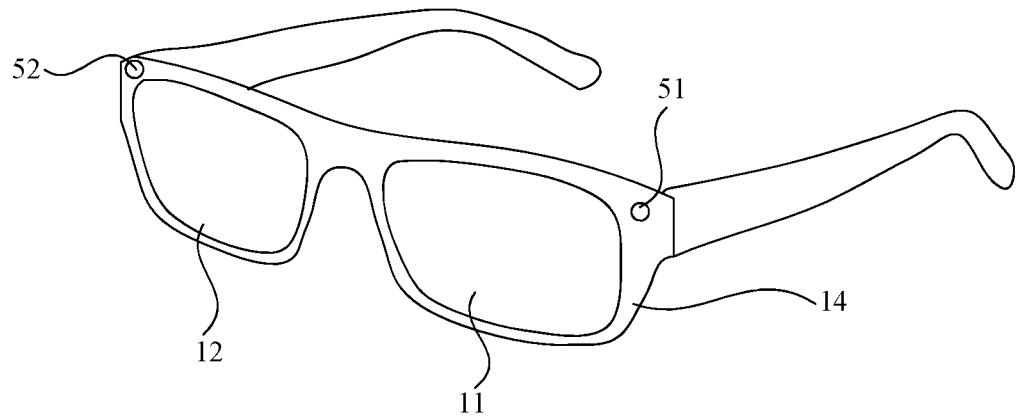
FIG. 5 is a schematic structural diagram of another eyewear according to an embodiment of the present disclosure.

In an embodiment of the present disclosure, there is further provided a control method of an eyewear. In this embodiment, on the basis of the embodiment shown in FIG. 2 and as shown in FIG. 5, the eyewear includes optics 11, 12, a camera device (not shown) and a frame 14.

In this embodiment, two optics are provided, and the eyewear may include a first optic 11 and a second optic 12. The first and second optics 11, 12 and the frame 14 are similar to those in the above embodiments, and thus are not repeated here.

In this embodiment, the camera device may include a first camera 51 and a second camera 52. The first camera 515 may be located on a side of the first optic 11 on the frame 14, and the second camera 52 may be located on a side of the second optic 12 on the frame 14. The environment image includes a first environment image and a second environment image. The first environment image may be an environment image captured by the first camera, and the second environment image may be an environment image captured by the second camera.

In this embodiment, starting the camera device to acquire the environment image may include: starting, by the processor, the first camera to acquire the first environment image, and starting the second camera to acquire the second environment image.

In this embodiment, performing enhancement processing on the environment image to obtain the enhanced environment image may include: performing enhancement processing on the first environment image to obtain an enhanced first environment image, and performing enhancement processing on the second environment image to obtain an enhanced second environment image. In this embodiment, the first and second environment images may be 2D images. The methods for performing enhancement processing on the first and second environment images in this embodiment are similar to that for performing enhancement processing on the 3D environment image in the foregoing embodiment, and thus are not repeated here.

In this embodiment, controlling the optic to display according to the enhanced environment image may include: controlling, by the processor, the first optic to display according to the enhanced first environment image, and controlling, by the processor, the second optic to display according to the enhanced second environment image. In this manner, the user may obtain the 3D environment information even in a dark environment.

Figure 6:
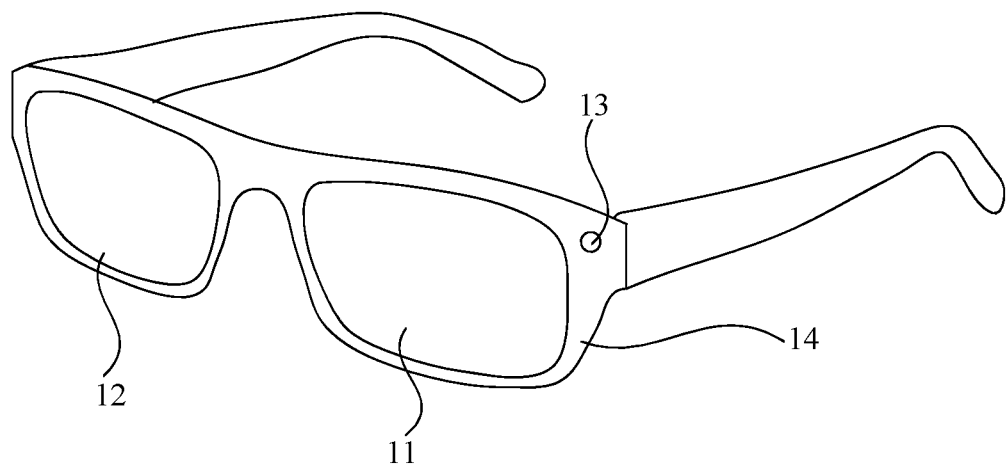
FIG. 6 is a schematic structural diagram of another eyewear according to an embodiment of the present disclosure.

In an embodiment of the present disclosure, there is further provided a control method of an eyewear. In this embodiment, on the basis of the embodiment shown in FIG. 2 and as shown in FIG. 6, the eyewear includes optics 11, 12, a camera device 13 and a frame 14.

In this embodiment, two optics are provided, and the eyewear may include a first optic 11 and a second optic 12. The first and second optics 11, 12 and the frame 14 are similar to those in the above embodiments, and thus are not repeated here.

In this embodiment, the camera device 13 may include one camera located on a side of the first optic 11 on the frame 14, or on a side of the second optic 12 on the frame 14. In this embodiment, introduction is made with the camera located on the side of the first optic 11 on the frame 14 as an example.

In this embodiment, starting the camera device to acquire the environment image may include: starting, by the processor, the camera to acquire a 3D environment image. The 3D environment image carries 3D environment information.

In this embodiment, performing enhancement processing on the environment image to obtain the enhanced environment image may include: performing, by the processor, enhancement processing on the 3D environment image to obtain an enhanced 3D environment image. The method of performing enhancement processing on the 3D environment image in this embodiment is similar to that for performing enhancement processing on the 3D in the foregoing embodiment, and thus is not repeated here.

In this embodiment, controlling the optic to display according to the enhanced environment image may include: controlling, by the processor, the first optic 11 to display according to the enhanced 3D environment image when the camera is located on the side of the first optic 11 on the frame 14. Obviously, when the camera is located on a side of the second optic 12 on the frame 14, the processor may control the second optic 12 to display according to the enhanced 3D environment image. Therefore, even in a dark environment, the user can obtain clear 3D environment information through one eye and perceive real environment information through the other eye. Thus, the user can obtain comprehensive environment information so that the user feels increased sense of safety and relieved tension in the dark environment.

In an embodiment of the present disclosure, there is further provided an eyewear. The eyewear may include: an optic, an optical sensor, a camera device, a frame, a processor and a memory. The optic, the optical sensor, the camera device, the processor and the memory are respectively located on the frame; the optic is a transparent display screen. The memory is configured to store a computer program; and the processor is configured to execute the computer program stored on the memory to implement steps of the method according to any of the above embodiments.

The beneficial effects of this embodiment include: by detecting the light intensity of the ambient light, obtaining the current light intensity of transmitted light generated after the ambient light passes through the optic, based on the light intensity of the ambient light and current light transmittance of the eyewear, and adjusting, when the current light intensity is greater than the selected light intensity, the light transmittance of the optic so that the light intensity of the transmitted light is the selected light intensity, a user can clearly see the surrounding environment information in a strong light environment, while fatigue caused by eye adjustment in the strong light environment or damage caused by the strong light is relieved. By starting the camera device to acquire the environment image when the current light intensity is smaller than the selected light intensity, performing enhancement processing on the environment image to obtain the enhanced environment image, and then controlling the optic to display according to the enhanced environment image, a user can also clearly see the surrounding environment information in a dark light environment. In summary, the technical solution provided by the embodiments of the disclosure can enable a user to clearly see the surrounding environment information in both a strong light environment and a dark light environment.

In an embodiment of the present disclosure, there is further provided a computer readable storage medium having a computer program stored thereon which, when executed by a processor, causes steps of the method according to any of the above embodiments to be implemented.

Regarding the devices in the above embodiments, the specific manner in which the processor executes the operations has been described in detail in the embodiments related to the method, and detailed description will not be given here.

Figure 7:
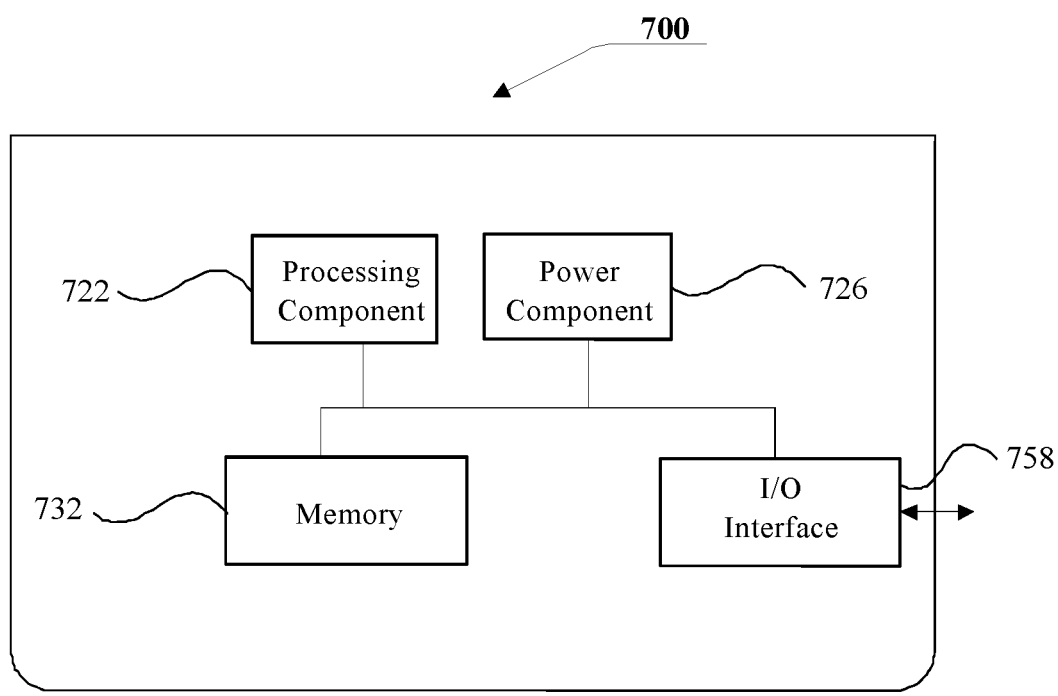
FIG. 7 is a block diagram of an eyewear according to an embodiment of the present disclosure.

FIG. 7 is a block diagram of an eyewear according to an exemplary embodiment. Referring to FIG. 7, the eyewear 700 includes a processing component 722 that further includes one or more processors, and memory resources represented by a memory 732 for storing instructions, e.g., applications, that are executable by the processing component 722. The applications stored in the memory 732 may include one or more modules corresponding to a set of instructions. Further, the processing component 722 is configured to execute instructions to perform the control method of an eyewear described above.

The eyewear 700 may further include a power component 726 configured to perform power management of the eyewear 700, and an input-output (I/O) interface 758. The eyewear 700 may be operated based on an operating system stored in the memory 732, such as Windows Server, Mac OS X™, Unix™, Linux™, FreeBSD™, or the like.

In an exemplary embodiment, there is further provided a non-transitory computer-readable storage medium including instructions, such as the memory 732 including instructions that are executable by the processing component 722 of the eyewear 700 to perform the methods described above. For example, the computer readable storage medium may be an ROM, a Random Access Memory (RAM), a CD-ROM, a magnetic tape, a floppy disk, an optical data storage device, and the like.

In the present disclosure, terms "first", "second", and the like are used for the purpose of illustration only and cannot be construed as indicating or implying a relative importance. The term "plurality" means two or more unless explicitly defined otherwise.

Other implementations of the disclosure will be apparent to those skilled in the art from consideration of the description and practice of the disclosure disclosed herein. The present disclosure is intended to cover any variations, uses, or adaptations of the disclosure which follow general principles of the disclosure and include common knowledge or conventional technical means in the art that are not disclosed herein. The description and the embodiments are intended to be considered as exemplary only, with a true scope and spirit of the disclosure being indicated by the following claims.

It will be appreciated that the present disclosure is not limited to the precise structures as described above and shown in the drawings, and that various modifications and changes may be made without departing from the scope of the present disclosure. The scope of the present disclosed is defined only in the appended claims.

What is claimed is:

1. A control method of an eyewear comprising an optic, a camera device and a frame; wherein the optic and the camera device are respectively located on the frame; and the optic is a transparent display screen; the control method of the eyewear comprising:
   detecting a light intensity of ambient light;
   obtaining a current light intensity of transmitted light generated after the ambient light passes through the optic, based on the light intensity of the ambient light and current light transmittance of the eyewear;
   adjusting the light transmittance of the optic when the current light intensity is greater than a first light intensity so that the light intensity of the transmitted light is the first light intensity;
   starting the camera device to acquire an environment image when the current light intensity is smaller than the first light intensity;
   performing enhancement processing on the environment image to obtain an enhanced environment image; and
   controlling the optic to display according to the enhanced environment image,
   wherein the eyewear further comprises a lens located on and movably connected to the frame;
   when the current light intensity is smaller than the first light intensity, the lens is positioned opposite to the optic, and a positional relation between the lens and the optic meets a selected condition so that the environment image displayed by the optic is imaged clearly on a fundus of a human eye; and
   when the current light intensity is equal to or greater than the first light intensity, the lens is not positioned opposite to the optic.

2. The control method of an eyewear according to claim 1, wherein the frame comprises a guide rail on which the lens is located; and the control method further comprises:

controlling the lens to move to a position opposite to the optic along the guide rail in a first direction when the current light intensity is smaller than the first light intensity; and controlling the lens to move to a designated position along the guide rail in a second direction when the current light intensity is equal to or greater than the first light intensity; wherein the second direction and the first direction are opposite to each other, and the lens is not located opposite to the optic at the designated position.

3. The control method of an eyewear according to claim 2, wherein the eyewear further comprises a receiving device located on the frame; a first end of the guide rail is located in the receiving device;

when the lens is located at the first end of the guide rail, the lens is located in an accommodation space of the receiving device; and when the current light intensity is smaller than the first light intensity, the lens is located at a second end of the guide rail, and positioned opposite to the optic.

4. The control method of an eyewear according to claim 3, wherein the guide rail is movably connected to the frame; and when the current light intensity is equal to or greater than the first light intensity, the second end of the guide rail is not positioned opposite to the optic.

5. The control method of an eyewear according to claim 1, wherein two optics are provided; the eyewear comprises a first optic and a second optic; the camera device comprises one camera;

starting the camera device to acquire the environment image comprises:

starting the camera to acquire a 3D environment image;

performing enhancement processing on the environment image to obtain the enhanced environment image comprises:

performing enhancement processing on the 3D environment image to obtain an enhanced 3D environment image; and controlling the optic to display according to the enhanced environment image comprises:

converting the enhanced 3D environment image into a 2D environment image;

splitting the 2D environment image to obtain a left-eye image and a right-eye image; and controlling the first optic to display the left-eye image and controlling the second optic to display the right-eye image.

6. The control method of an eyewear according to claim 1, wherein two optics are provided; the eyewear comprises a first optic and a second optic; the camera device comprises a first camera and a second camera; the first camera is located on a side of the first optic on the frame, and the second camera is located on a side of the second optic on the frame; the environment image comprises a first environment image and a second environment image;

starting the camera device to acquire the environment image comprises:

starting the first camera to acquire the first environment image, and starting the second camera to acquire the second environment image;

performing enhancement processing on the environment image to obtain the enhanced environment image comprises:

performing enhancement processing on the first environment image to obtain an enhanced first environment image; and performing enhancement processing on the second environment image to obtain an enhanced second environment image; and controlling the optic to display according to the enhanced environment image comprises:

controlling the first optic to display according to the enhanced first environment image, and controlling the second optic to display according to the enhanced second environment image.

7. The control method of an eyewear according to claim 1, wherein two optics are provided; the eyewear comprises a first optic and a second optic; the camera device comprises one camera; the camera is located on a side of the first optic on the frame, or the camera is located on a side of the second optic on the frame;

starting the camera device to acquire the environment image comprises:

starting the camera to acquire a 3D environment image;

performing enhancement processing on the environment image to obtain the enhanced environment image comprises:

performing enhancement processing on the 3D environment image to obtain an enhanced 3D environment image; and controlling the optic to display according to the enhanced environment image comprises:

controlling the first optic to display according to the enhanced 3D environment image when the camera is located on the side of the first optic on the frame, and controlling the second optic to display according to the enhanced 3D environment image when the camera is located on the side of the second optic on the frame.

8. An eyewear, comprising: an optic, an optical sensor, a camera device, a frame, a processor and a memory; wherein the optic, the optical sensor, the camera device, the processor and the memory are respectively located on the frame; the optic is a transparent display screen; the memory is configured to store a computer program; and the processor is configured to execute the computer program stored on the memory to implement steps of the method according to claim 1.

9. A computer readable storage medium having a computer program stored thereon which, when executed by a processor, causes steps of the method according to claim 1 to be implemented.

* * * * *